United States Patent
Heaven et al.

(10) Patent No.: US 7,529,712 B2
(45) Date of Patent: May 5, 2009

(54) CONTENT DISTRIBUTION SYSTEM AND METHOD

(75) Inventors: John Heaven, Ontario (CA); Wojtek Hoch, Etobicoke (CA); Cliff Hunt, Mississauga (CA)

(73) Assignee: Yangaroo Inc., Richmond Hill, Ontario ( * ) Notice: Subject to any disclaimer, the term of this patent is extended or adjusted under 35 U.S.C. 154(b) by 1060 days.

(21) Appl. No.: 10/431,854

(22) Filed: May 8, 2003

(65) Prior Publication Data
US 2004/0015445 A1    Jan. 22, 2004

(30) Foreign Application Priority Data
Jul. 16, 2002    (CA)    ................................. 2393685
Oct. 11, 2002    (CA)    ................................. 2407774

(51) Int. Cl.
*H04K 1/00*    (2006.01)
*H04L 9/00*    (2006.01)

(52) U.S. Cl. .............................. 705/51; 705/52; 705/53; 705/54; 705/55; 705/56; 705/57; 705/58; 705/59

(58) Field of Classification Search ............. 705/51–60, 705/26, 27; 380/30, 279, 277, 44; 713/193
See application file for complete search history.

(56) References Cited

U.S. PATENT DOCUMENTS

| | | | | |
|---|---|---|---|---|
| 4,805,222 A | * | 2/1989 | Young et al. ................. | 382/115 |
| 5,638,443 A | * | 6/1997 | Stefik et al. .................... | 705/54 |
| 5,765,152 A | | 6/1998 | Erickson | |
| 5,765,153 A | * | 6/1998 | Benantar et al. ............... | 707/9 |
| 5,790,790 A | | 8/1998 | Smith et al. | |
| 5,802,518 A | | 9/1998 | Karaev et al. | |
| 5,819,271 A | | 10/1998 | Mahoney et al. | |
| 5,845,067 A | | 12/1998 | Porter et al. | |
| 5,864,871 A | | 1/1999 | Kitain et al. | |
| 5,892,900 A | * | 4/1999 | Ginter et al. .................. | 726/26 |

(Continued)

FOREIGN PATENT DOCUMENTS

CA    2201200    9/1998

(Continued)

OTHER PUBLICATIONS

Bertino et al (Securing XML Documents with Author-X, IEEE Internet Computing, May-Jun. 2001.*

(Continued)

*Primary Examiner*—Jalatee Worjloh
*Assistant Examiner*—Cristina Owen Sherr (57) ABSTRACT

A method and system for the secure distribution of content to authorized persons. A content provider uploads encrypted content to the system and specifies the institutions or individuals to which the content is to be provided and release conditions under which it is to be made available. Encrypted content is made available to a recipient together with a decryption code, if the identity of the recipient can be confirmed through a validation procedure and if the release conditions are met. The release conditions may include a time and date at which the release is to occur. The encrypted content have an associated sample which may be streamed to the recipient so as to permit the recipient to assess whether to download the full encrypted content or not. In one embodiment, the validation procedure includes biometric validation of the identity of the recipient.

1 Claim, 4 Drawing Sheets

U.S. PATENT DOCUMENTS

| | | | |
|---|---|---|---|
| 5,892,909 | A | 4/1999 | Grasso et al. |
| 6,122,737 | A * | 9/2000 | Bjorn et al. ................. 713/186 |
| 6,185,684 | B1 | 2/2001 | Pravetz et al. |
| 6,226,618 | B1 * | 5/2001 | Downs et al. ................... 705/1 |
| 6,263,313 | B1 * | 7/2001 | Milsted et al. ................. 705/1 |
| 6,332,146 | B1 | 12/2001 | Jebens et al. |
| 6,334,130 | B1 | 12/2001 | Tada et al. |
| 6,366,914 | B1 | 4/2002 | Stern |
| 6,385,596 | B1 | 5/2002 | Wiser et al. |
| 6,553,404 | B2 | 4/2003 | Stern |
| 6,717,957 | B1 | 4/2004 | Quine |
| 7,003,670 | B2 | 2/2006 | Heaven et al. |
| 7,305,702 | B2 | 12/2007 | Bell et al. |
| 2002/0016718 | A1 | 2/2002 | Rothschild et al. |
| 2002/0052887 | A1 | 5/2002 | Mori |
| 2002/0083006 | A1 | 6/2002 | Headings et al. |
| 2002/0146122 | A1 | 10/2002 | Vestergaard et al. |
| 2002/0169667 | A1 | 11/2002 | Marotta et al. |

FOREIGN PATENT DOCUMENTS

| | | |
|---|---|---|
| CA | 2242130 | 9/2001 |
| CA | 2299946 | 9/2001 |
| CA | 2345170 | 10/2001 |
| JP | 2003-330881 A1 | 5/1999 |
| JP | 2002-169973 A2 | 12/2000 |
| WO | WO 97/09801 | 3/1997 |
| WO | WO 00/79826 | 6/2000 |
| WO | WO 01/54324 | 1/2001 |
| WO | WO 01/82023 | 4/2001 |
| WO | WO 01/33829 | 5/2001 |
| WO | WO 01/98903 | 6/2001 |
| WO | WO 01/65796 A1 | 9/2001 |
| WO | WO 02/45316 | 11/2001 |
| WO | WO 02/48903 | 6/2002 |

OTHER PUBLICATIONS

John R. Luni et al., *Streaming Audio: The FezGuys' Guide*, New Writers Publishing, May 2002, Chapters 1, 3-7, 8-9 (Luni).

Seth McEvoy, *Windows Media Player 7 Handbook*, Microsoft Press 2000, Chapters 2, 3 and 4 (McEvoy).

Bradley Ford et al., *Revolutionary Quick Time Pro*, Friends of Ed, Mar. 2002, Chapter 6 (Ford).

Tim Berners-Lee, *Information Management; A Proposal*, http://www.w3.org/History/1989/proposal.html, 1989 and subsequent revisions thereto (Burners-Lee).

Daniel J. Barrett, *Bandits on the Information Superhighway*, Riley and Associates, Feb. 1996, Chapter 7: Pranks, Spams, and Timewasters (Barrett).

Anonymous, *Maximum Linux Security*, Sep. 1999, Capter 14: Web Server Security (Linux).

http://web.archive.org.web/19980714063904/northplains.com/developer.html.

http://web.archive.org/web/19981203011640/http://northplains.com/faq.html.

http://www.northplains.com/media_center/pressrelease_archive.html.

http://web.archive.org/web/19980714063904/northplains.com/developer.html.

CNET News.com article "The latest in anti-piracy efforts: keystroke recognition" by John Borland dated Jun. 2000, http://news.com.com/2100-1023-241792.html.

New York Times article "New Encryption Strategy: Typing Rhythm" by Michel Marriott dated Jun. 2000, http://partners.nytimes.com/library/tech/00/06/circuits/articles/29type.html.

Wired article "Songs in the Key of You" by Frank Jossi dated Oct. 2000, http://wired.com/wired/archive/8.10/mustread.html?pg=10.

Various WebPages and Press Releases by Musicrypt Inc., 2001, http:web.archive.org.web/20010608010344rn_2/www.musicrypt.com/html/ and other pages.

http://web.archive.org/web/20020525051326/www.destiny-software.com/ and other pages.

Bulletin Board Systems.

On-Line Music Distribution and Sale Systems.

On-Line Text Distribution Sale Systems.

On-Line Banking Systems.

FidoNet, Software Creations BBS, and The Gaming Center BBS.

Pressplay, MusicNet, BMG Canada Intranet/Filevault, and Home of Music (www.homeofmusic.com).

Corbis Images (www.corbisimages.com), Getty Images and eMeta (a digital content management solution for various e-publishers, including the Globe and Mail online subscription service and the New York Times on-line service).

OFX, the Open Financial Exchange (OFX) standard.

Driveway Corporation Archival Web Pages 2000; http://web.archive.org/web/20000823022622/http:/driveway.com/; http://web.archive.org/web/20000815062458/corp.driveway.com/corp/about.html; http://web.archive.org/web/20000815080755/corp.driveway.com/corp/learn_more.html; /http://web.archive.org/web/20000819133139/corp.driveway.com/corp/support/support_howto7.html

*Xdrive Workgroup User Guide*, version 2.3g, Xdrive Technologies, Inc., Feb. 8, 2002.

R&R Music Meeting Archival Web Page 2001; http://web.archive.org/web/20011024233603/www.rrmusicmeeting.com/top.htm; http://web.archive.org/web/20011028133625/www.rrmusicmeeting.com/Faq.htm.

*Xerox DocuShare 2.2 User Guide* 2000; Using Xerox DocuShare 2.2; Copyright 1997-2000 Xerox Corporation.

http://www.ftsc.org//docs/fsc-0087.001; Oct. 31, 1995; Robert Williamson FidoNet.

http://www.fidonet.org/old/policy4.txt; Jun. 9, 1989; FidoNet Policy Document.

http://www.ftsc.org/docs/fsc-0013.001; Dec. 18, 1987; *A Standard for "Bark" File Requests*; Fidgit Greylock, Greylock Software.

http://www.ftsc.org/docs/fsc-0028.001; 1988, *FwdSpec-A Collection of Notes on Moving Files to FidoNet*.

http://www.ftsc.org/docs/fsc-0073.001; Jul. 28, 1993; John Mudge; *Encrypted Message Identification for FidoNet*.

http://www.w3.org/Daemon/User/Config/AccessAuth.html; *Protected W3Chttpd Setup*; Jul. 1995.

http://www.etsimo.uniovi.es/-antonio/cern_httpd/Config/AccessAuth.html; Ari Luotonen, CERN, 1994; *Protected CERN Server Setup*.

http://www.w3.org/Daemon; Sep. 28, 1999, Dan Connolly; CERN httpd.

*Apache Desktop Reference*; Apache HTTP Ralf S. Engelschall; Oct. 2000; pp. 1-113.

http://httpd.apache.org/docs/howto/auth.html; *Configuration: Protecting Content with Basic Authentication*; Dec. 5, 2001.

http://httpd.apache.org/docs/howto/auth.html; *Apache HTTP Server Version* 1.3; Dec. 5, 2001.

http://web.archive.org/web/2002020205232740/www.dgsystems.com;internal/services/mds.shtml; Digital Generation Systems, Inc.: 2001.

http://web.archive.org/web/19970120193358/www.dgsystems.com/dgsystems/u2.htm; Digital Generation Systems, Inc.; 1997.

http://web.archive.org/web/19970129005121/www.dgsystems.com/dgsystems/musicds.htm; *Products and Services, Music Delivery Services*; Digital Generation Systems, Inc.; 1997.

http://web.archive.org/web/1999042713340/http://www.dgsystems.com; DG Systems; *The First Name in Digital Delivery*; Digital Generation Systems, Inc.; 1998.

http://web.archive.org/web/19991128141333/www.dgsystems.com/dgsystems/musicds.htm; *Music Delivery Services*; Digital Generation Systems, Inc.; 1998.

http://web.archive.org/web/20020205183035/www.dgsystems.com/internal/services/ad.shtml; *Advantage Audio Delivery Service*; Digital Generation Systems, Inc.; 2001.

http://web.archive.org/web/20021120213006/www.pressplay.com/faq.html; *Pressplay*; 2001-2001.

http://web.archive.org/web/20021130023215/http://pressplay.com; *Pressplay*; 2001.

http://web.archive.org/web/20011207132135/pressplay.com/pressrelease20000502.html; *Pressplay; Sony Music Entertainment and Universal Music Group to Create Joint Venture to Develop Subscription-Based Service*; May 2, 2000.
http://web.archive.org/web/20011207132649/pressplay.com/pressrelease20010405.html; *Pressplay; Yahoo! and Duet Announce an Alliance to Present and Market the On-Demand Music Subscription Service Created by Sony Music Entertainment and Universal Music Group*; Apr. 5, 2001.
http://web.archive.org/web/20020125000045/www.musicnet.com; *MusicNet News Announcement*; 2002.
http://web.archive.org/web/20020204101756/www.musicnet.com/press; *MusicNet Launches Today on RealOne Music*; Dec. 4, 2001.
http://web.archive.org/web/20020204095613/www.musicnet.co.html; *What is Musicnet*; pp. 1-3; 2002.
http://web.archive.org/web/19980614221917/www.digitalcourier.com/SHARES.HTM; Digital Courier International Press Releases; *Shareholder Information; Digital Courier International? From a Business Perspective*; May 1, 1996.
http://web.archive.org/web/19970329170813/http://www.digitalcourier.com; Digital Courier International Press Releases; *Your Partner in Digital Communications*; Apr. 14, 1997.
http://web.archive.org/web/19970505213735/www.digitalcourier.com/NETSTN.HTM; Digital Courier International Press Releases; *The DCI Network-Radio Stations*; 1996.
http://web.archive.org/web/19970505214509/www.digitalcourier.com/NETREC.HTM; Digital Courier International Press Releases; *The DCI Network-Rrecord Companies*; 1997.
http://web.archive.org/web/19970505214722/www.digitalcourier.com/SHARES.HTM; Digital Courier International Press Releases; *DCI? from a Business Perspective*; 1997.
http://web.archive.org/web/19970505215540/www.digitalcourier.com/COMREC.HTM; Digital Courier International Press Releases; *News Travel Fast with Digital Courier*; Apr. 23, 1997.
http://web.archive.org/web/19970505215816/www.digitalcourier.com/PRESPHL.HTM Digital Courier International Press Releases; *Phil Collins Dances Into the Light with Digital Courier*; Sep. 27, 1996.
http://web.archive.org/web/19970505215932/www.digitalcourier.com/PRESJAM.HTM; Digital Courier International Press Releases; *Sony Releases "Pearl Jam" Over Digital Courier*; Jul. 30, 1996.
http://web.archive.org/web/20010418173630/http://firstpin.com/; firstspin.com; *FAQ*, 2001.
http://web.archive.org/web/20010418173911/firstspin.com/faq_center.html; firstspin.com; *FAQ*; 2001.
http://web.archive.org/web/20010611085807/firstspin.com/center.html; firstspin.com; *We Get You New Music First!*; 2001.
http://web.archive.org/web/20020601180716/www.firstpin.com/public/index.asp; firstspin; *Welcome to FIRSTSPIN Intelligent Media Distribution Network*; 2002.
http://web.archive.org/web/20020601180716/www.firstpin.com/public/index.asp; firstspin; *Intelligent Media Distribution Network Services*; 2002.
http://web.archive.org/web/20020812000108/www.firstpin.com/public/advertising.asp; firstspin; *Intelligent Media Distribution Network Advertising Industry*; 2002.
http://web.archive.org/web/20020812001227/www.firstpin.com/public/support/index.asp; firstspin; *Intelligent Media Distribution Network Tech Support*; 2002.
http://web.archive.org/web/20020812001322/www.firstpin.com/public/services/record_industry.asp; firstspin; *Intelligent Media Distribution Network Record Industry*; 2002.
http:/web.archive.org/web/20020812001429/www.firstpin.com/public/services/radio_stations.asp; firstspin; *Intelligent Media Distribution Network Radio Stations*; 2002.

http://web.archive.org/web/20020812113302/www.firstpin.com/public/support/faqs.asp; firstspin; *Intelligent Media Distribution Network Tech Support*; 2002.
Article *FIRSTSPIN Secure Private Informationa Network for Media Companies in the Recorded Music Sector*; 8 pp. (no date).
http://web.archive.org/web/20000512113254/http://www.spottaxi.com; SPOT TAXI.com; 11 pages; © 1999-2000 Central Media Inc.
http://judiciary.senate.gov/oldsite/te040301.gwk.htm; *Statement of On Gerald W. Kearby President and Chief Executive Office Liquid Audio, Inc. Before the United States Senate Committee on the Judiciary "Online Entertainment and Copyright Law: Coming Soon to a Digital Device Near You."* Apr. 3, 2001.
http://recording.org/ftopicp-504.html; recording.org; *Metro Music Presents True Soundcontrol; Radio Programers to Listen to New Music Online*; Sep. 9, 2001.
http://web.archive.org/web/19980211105331/www.liquidaudio.com/company/index.html; Liquid Audio; *Company*; © 1996-1997; 20 pages.
http://web.archive.org/web/20011024233603/www.rrmusicmeeting.com/top.htm; *Your Destination for Promotional Music Online Welcome*; 6 pages.
http://web.archive.org/web/20020602110630/www.emeta.com/erights; *eMeta Frequency Asked Questions*; © 2002 eMeta Corporation; 15 pages.
Manual *Docushare Quick Start Users Manual*; Julie Cadham; Feb. 21, 2002, Concordia University; 30 pages.
http://web.archive.org/web/20010610234928/www.drive.com/site/consumer/web.html; *i-drive Consumer*; Jan. 16, 2008; 9 pages.
*Enterprise Document Management System*; PC Docs Fulcrum; © 1999PC Docs; 4 pages.
http://web.archive.org/web/20020925142035/pro.corbis.com; *Corbis Professional Licensing Cart*; 2002; 3 pages.
http://www.gettyimages.com/Corporate/LicenseInfo.aspx; gettyimages; © 1996-2008 Getty Images Inc.; 8 pages.
*Open Financial Exchange Specification 1.0.2; Chapters* 1-4; May 30, 1997; © 1997 CheckFree Corp, Intuit Inc., Microsoft Corp.
*Open Financial Exchange Specification 1.0.2; Chapters* 5-7; May 30, 1997; © 1997 CheckFree Corp, Intuit Inc., Microsoft Corp.
*Open Financial Exchange Specification 1.0.2; Chapters 8-10;* May 30, 1997; © 1997 CheckFree Corp, Intuit Inc., Microsoft Corp.
*Open Financial Exchange Specification 1.0.2; Chapter 11 and Appendix*; May 30, 1997; © CheckFree Corp, Intuit Inc., Microsoft Corp.
*Open Financial Exchange*; May 30, 1997; © 1997 CheckFree Corp, Intuit Inc., Microsoft Corp.
*Controlling Access to XML Documents*; Ernesto Damiani et al.; Nov. Dec. 2001; IEE Internet Computing; pp. 18-28.
*Supporting Multiple Access Control Policies in Database Systems*; Elisa Bertino et al.; 14 pages.
Article: Software Magazine; *Document Management on LANs is in Demand; Groups Need Version, Access, Retrieval Control—Local Area Networks—Applications Management: Image and Text Systems*; Feb. 19991.
A Key Distribution Method for Object-Based Protection, Ford et al., pp. 193-197, Association of Computing Machinery.
S/Mime and Open PGP Vie for Security Title, Network Computing, Three pages. www.networkcomputing.com/904/904btb.html.
Securing XML Documents with Author-X, Bertino et al., IEEE Internet Computing, Jun. 2001, pp. 21-31.
*Document Management on LANs is In Demand*, nine pages, http://findarticles.com/p/articles/mi_m0SMG/is_n2_v11/ai_1035941.

\* cited by examiner

CONTENT DISTRIBUTION SYSTEM AND METHOD

FIELD OF THE INVENTION

This invention relates to the distribution of content to remote locations over a network, and more particularly to the secure distribution of content to authorized persons.

BACKGROUND OF THE INVENTION

The security and timing of the release of promotional material can be of vital importance to the developers of that material. For example, in the music industry a key component of marketing is the release of a single off a new album to radio stations. The listener response to a new single provides important information upon which wider marketing and release decisions will be based. For radio stations, the release of a new single also provides them with a promotional event to boost market share. Being the first station to premiere a new single by a popular artist can provide a competitive advantage.

Accordingly, controlling the timing of the release of a single and the persons receiving it is an important aspect of a recording label promotional program. Traditionally, the distribution is done by creating a promotion-only CD containing the single track and then distributing this CD to individual radio stations by courier. This method has many drawbacks, including the number of people who handle the CD while it is in transit. In many instances, a new single has been illicitly copied or stolen, distributed to unauthorized persons and released to the public prior to the intended release date and time. Moreover, this method is difficult to time accurately, is labour-intensive and subject to disruption from weather, labour strife, transportation problems and human error. Ensuring that competitive radio stations have access to a new single simultaneously and securely is important to the trust between the record label and the radio stations.

The same difficulties can be found in other industries and circumstances, including the distribution of new movies in the film industry and the distribution of new campaigns in the advertising industry. In general, the problem is experienced in any industry in which a content provider wishes to ensure the security and simultaneous timing of a distribution of content to a plurality of recipients.

As a further example, the advertising industry experiences difficulty in obtaining appropriate approvals from designated reviewers when a new proposed advertisement is developed. At present, it is common for advertising firms to create a dub of a proposed advertising spot and courier it to the intended reviewers, with the expectation that the reviewers will review the spot and telephone to grant their approval or disapproval. In some cases, it has been necessary to play a proposed advertisement to a reviewer over the telephone in order to obtain their approval or disapproval. Accordingly, there is presently an unacceptable level of delay, cost, uncertainty and inaccuracy involved in the distribution and approval of proposed new advertisements.

SUMMARY OF THE INVENTION

The present invention provides a method and system for the secure distribution of content to authorized persons. A content provider uploads encrypted content to the system and specifies the institutions or individuals to which the content is to be provided and release conditions under which it is to be made available. Decrypted content is made available to a recipient, if the identity of the recipient can be confirmed through a validation procedure and if the release conditions are met. The release conditions may include a time and date at which the release is to occur. In one embodiment, the validation procedure includes biometric validation of the identity of the recipient.

In one aspect, the present invention provides a method of distributing content to a plurality of recipients from a database over a distributed computer network, each recipient having a terminal connected to the network, and the database containing an encrypted content file. The method includes verifying the identity of a recipient by obtaining a biometric input and comparing it with a stored biometric profile. The method also includes permitting the selection of an encrypted content file by the recipient. If the recipient's identify is verified, then the method includes providing the recipient with a decrypted copy of the encrypted content file. The step of providing can include downloading or streaming the decrypted copy, or downloading an encrypted copy together with decryption information for decrypting it at the recipient's teminal. In one embodiment, the recipient may review one or more samples of the content prior to downloading and decrypting the content file, and may tag the files in which the recipient is interested.

In another aspect of the present invention, the content is a proposed advertisement, and the method includes receiving and registering the approval, disapproval, comments or suggestions of the recipient reviewers. In one embodiment, the system and method include business rules for evaluating whether an advertisement has been approved or not.

BRIEF DESCRIPTION OF THE DRAWINGS

Reference will now be made, by way of example, to the accompanying drawings which show an embodiment of the present invention, and in which.

DESCRIPTION OF SPECIFIC EMBODIMENTS

Figure 1:
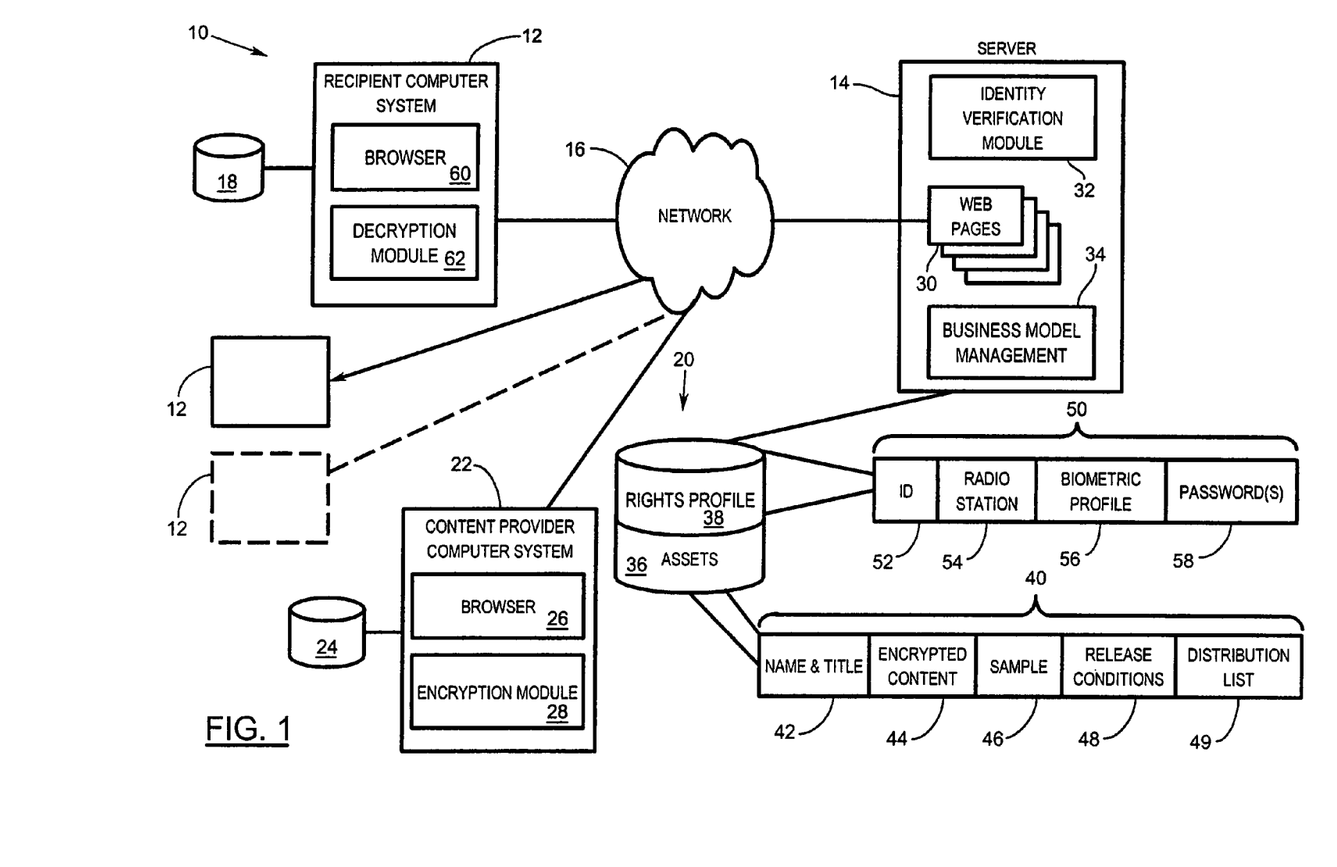
FIG. 1 shows a block diagram of an embodiment of a content distribution system according to the present invention.

Reference is first made to FIG. 1, which shows a block diagram of an embodiment of a content distribution system 10 according to the present invention. A plurality of recipient computer systems 12 and a remote distribution server 14 are mutually connected via a communications network 16, such as the Internet. Also connected to the communications network 16 is a content provider computer system 22. The content provider computer system 22 provides content to the server 14 for distribution to the recipient computer systems 12, as is further detailed below. In one embodiment, as described herein, the content is prerecorded digital music provided by a record label promotions director for distribution to radio stations, however it will be understood that the present invention is not limited to this embodiment. The content is not limited to music and may include other content, such as text, audio, video, computer software, or visual media like advertising and promotions. Other content will be understood by those skilled in the art upon a review of the following description of the present invention.

The content provider computer system 22 may be any conventional personal computer. The content provider computer system 22 is connected to a storage medium 24 containing the content intended for distribution to the recipient computer systems 12. The storage medium 24 may include ROM, RAM, floppy discs, compact discs, digital tape or any other medium on which content may be stored. The content provider computer system 22 includes a browser 26 for accessing web pages through the communications network 16. The content provider computer system 22 also includes an encryption module 28 for encoding, encrypting and uploading the content. It will be understood that the content provider computer system 22 may have more or fewer components than, or alternative components to, those shown in FIG. 1 and still provide the same functionality described herein.

Similarly, the recipient computer system 12 may be any conventional personal computer. The recipient computer system 12 also includes a browser 60 for accessing web pages through the communication network 16. The recipient computer system 12 includes a decryption module 62 for decrypting content obtained from the remote distribution server 14. The recipient computer system 12 is connected to a storage device 18 for storing any encrypted or decrypted content. In one embodiment, the storage device 18 is a mass storage device containing music in WAV format for use in radio broadcasts. Again, it will be understood that the recipient computer system 12 may have more or fewer components and still provide the same functionality described herein.

The remote distribution server 14 is configured to receive encrypted content from the content provider computer system 22 and to distribute the content to individual recipient computer systems 12, subject to verification of the identity of the user of the recipient computer system 12 and to the release time or date restrictions imposed by the user of the content provider computer system 22. The remote distribution server 14 ensures that decrypted content is not provided to unauthorized individuals or provided before the release time and date.

The remote distribution server 14 includes web pages 30 to provide a graphical user interface with the content provider computer system 22 and the recipient computer systems 12. The remote distribution server 14 also includes an identity verification module 32 and a business model management module 34. Connected to and accessible to the remote distribution server 14 is a mass storage device 20. The mass storage device 20 includes a rights profile database 38 and an asset database 36.

The identity verification module 32 permits access to the content distribution system 10 to be controlled based upon biometric verification of the identity of an individual using either a recipient computer system 12 or a content provider computer system 22. Verification of the individual's identity is accomplished by comparing the characteristics of the individual's typing cadence with a previously stored profile of the same activity collected during a registration process which involves reiterative entry of the same password or passphrase. An example of a keystroke dynamics biometric identity verification system can be seen in U.S. Pat. No. 4,805,222, which has been assigned to Net Nanny Inc. of Vancouver, B.C., Canada. In one embodiment of the present invention, the identify verification module 32 compares the individual's e-mail address, user name and password as well as biometric data, to prevent unauthorized access. By limiting distribution of content to particular individuals through validating the identity of the individuals, rather than the identity of a particular computer system, the possibility of unauthorized access to the content is minimized. In the context of a radio station, only one or two individuals at a particular radio station may be authorized to access content on the system 10.

The rights profile database 38 includes a database of individual user profiles for those users that have registered to access the system 10, either, as recipients or content providers. Each entry 50 in the rights profile database 38 may include identification information 52, such as user name, e-mail address or other identifying information. Each entry 50 may also include, in this embodiment, a radio station 52 with which the individual user is associated. Also included in each user entry 50 is biometric data 56 for use by the identity verification module 32 and one or more passwords 58. Further or other information may be included in the entries 50.

The asset database 36 includes the securely encrypted content provided by various content providers. Each entry 40 in the database includes song identification information 42 such as the artist's name, the title of the song and other information. Also included is a pointer or address information 44 for accessing the encrypted digital music single in the database. The entry 40 may also include a streaming unencrypted sample 46 of the music single. The sample allows a recipient to evaluate and pre-screen new upcoming singles and make programming decisions. The entry 40 also includes a release time and date 48 and a distribution list 49 of recipients that will be granted access to the digital music single. In one embodiment, the entry 40 includes an associated graphic (not shown), such as a photo, artist logo or album cover. The entry 40 may also include a pointer to an associated video (not shown) that may be downloaded with the digital music single or streamed to the recipient computer system 12. Further or other information may be included in the entries 40.

The business model management module 34 controls access to content of the asset database 36 based upon the distribution list 49 and the user profiles in the rights profile database 38, and it performs billing and reporting functions.

Figure 2:
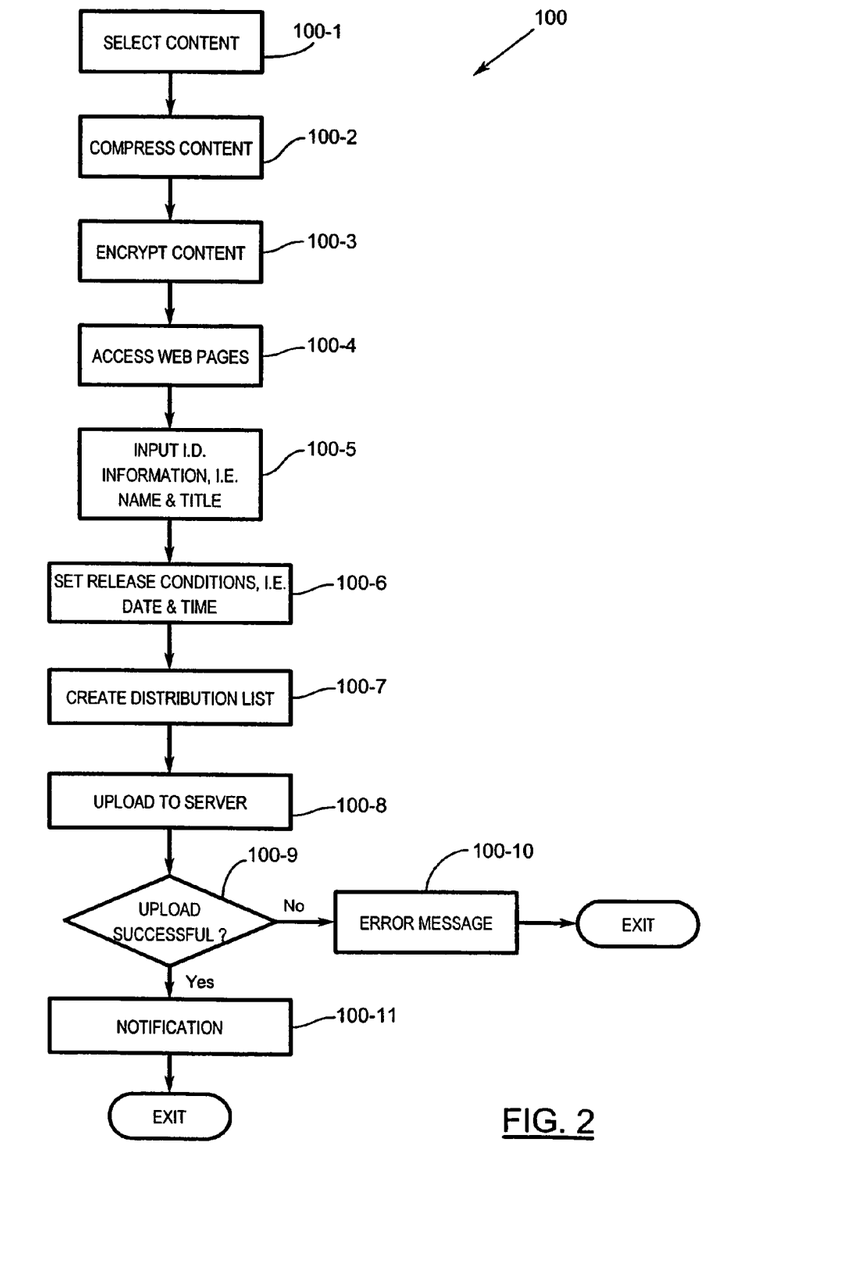
FIG. 2 shows a flowchart outlining an embodiment of the steps for loading content into a distribution system according to the present invention.

In operation, a content provider, such as a record label promotions director, uses the content provider computer system 22 to upload an encrypted digital music single to the remote distribution server 14. Reference is made to FIG. 2, which shows a flowchart 100 outlining an embodiment of the steps for loading content upon the server 14. To begin the process, the content provider uses the encryption module 28 to select content from the storage medium 24 (step 100-1). The storage medium 24 may be the artist's unreleased CD placed in the CD drive of the content provider computer system 22. The encryption module 28 is then employed to compress (step 100-2) and encrypt (100-3) the content. The content having been selected, compressed and encrypted, the encryption module 28 causes the browser 26 to be launched and to access the web pages 30 provided by the server 14 (step 100-4). The web pages 30 to which the encryption module 28 directs the browser 26 step the content provider through the process of uploading the encrypted digital file.

To upload a track, the content provider enters identification data 42 (step 100-5), such as the name of the track and the artist's name. Other information may be entered, such as the length of the track or the title of an associated album. The content provider then chooses a release time and date 48 (step 100-6). The content provider next selects a distribution list 49 of the individuals or radio stations that will be entitled to receive the single (step 100-7). The encrypted content is then uploaded to the server 14 for storage on the mass storage device 20 (step 100-8). If there are associated graphics or video for distribution with the encrypted digital music single, then those are also uploaded to the server 14. The server 14 assesses whether the transfer was successful (step 100-9) and sends an error message (step 100-10) to the content provider computer system 22 if the upload failed. If successful, the server 14 sends a confirmation to the content provider computer system 22 (step 100-11). The server 14 may also send a notification to the recipients in the distribution list 49 to alert them to existence of an upcoming single release.

Figure 3:
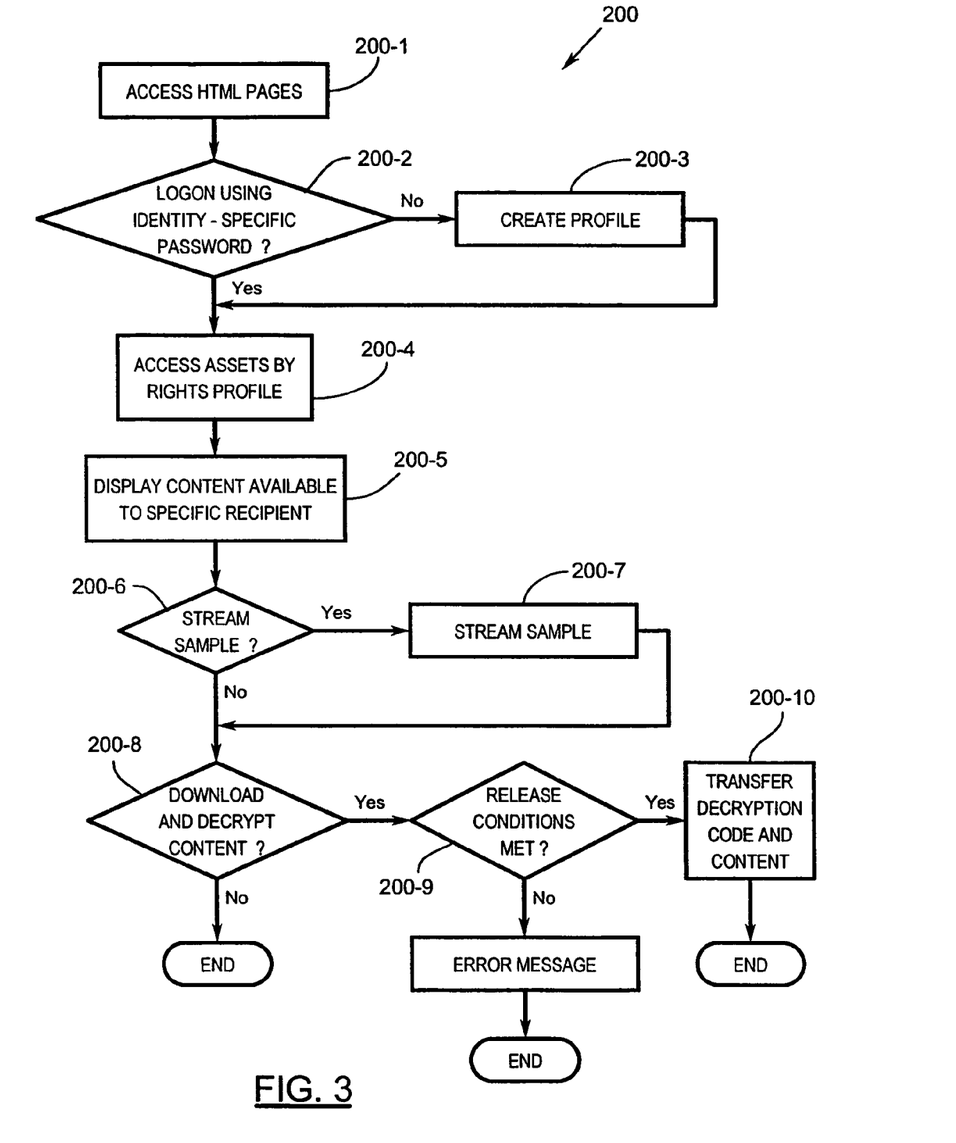
FIG. 3 shows a flowchart outlining an embodiment of the steps for distributing content to recipients according to the present invention.

FIG. 3 shows a flowchart 200 outlining an embodiment of the steps for distributing content to recipients. A radio station music director, for example, may access a new single release through the content distribution system 10 by using a recipient computer system 12. The music director may employ the browser 60 to access the web pages 30 on the server 14 (step 200-1). If the music director has a user profile in the rights profile database 38 then he or she may log on using their biometric password (step 200-2). The identity verification module 32 will verify their identity. If the music director does not have a valid user profile, then he or she will be directed through a registration process to establish a user profile (step 200-3).

Once the identity of the music director has been verified, the system 10 accesses the assets database 36 and the rights profile database 38 and determines which singles have a distribution list 49 that includes the music director or his radio station (step 200-4). The system 10 will then display information regarding the singles that the music director is entitled to access (step 200-5).

In one embodiment, the information will include singles prior to their release date. The music director may choose to listen to sample tracks (step 200-6), which are then streamed unencrypted to the recipient computer system, for example in MP3 format (step 200-7). These sample tracks are of insufficient length or quality to be used for radio play and, thus, pose little risk insofar as the security of the single is concerned. The system 10 may permit the music director to tag or select singles as "favorites" or "notables", allowing a music director to sort through hundreds of samples and easily return to those which require further consideration or download. Such a feature may also permit the music director to save his or her preferences so as to preserve the list of tagged files.

The music director may choose to download (step 200-8) any full length singles to which he or she has authorized access provided the single release time/date has been reached. If the release conditions are not met (step 200-9), the music director will receive an error notification informing him or her of the date and time at which they may return to download the single. In another embodiment, the music director may be permitted to download encrypted singles prior to the release date, but will not be provided with the decryption code for decrypting the singles until the release date and time. Singles are downloaded (step 200-10) in encrypted compressed WAV format and are decrypted and decompressed on the recipient computer system 12 using the decryption module 62 and the decryption code provided by the server 14.

Figure 4:
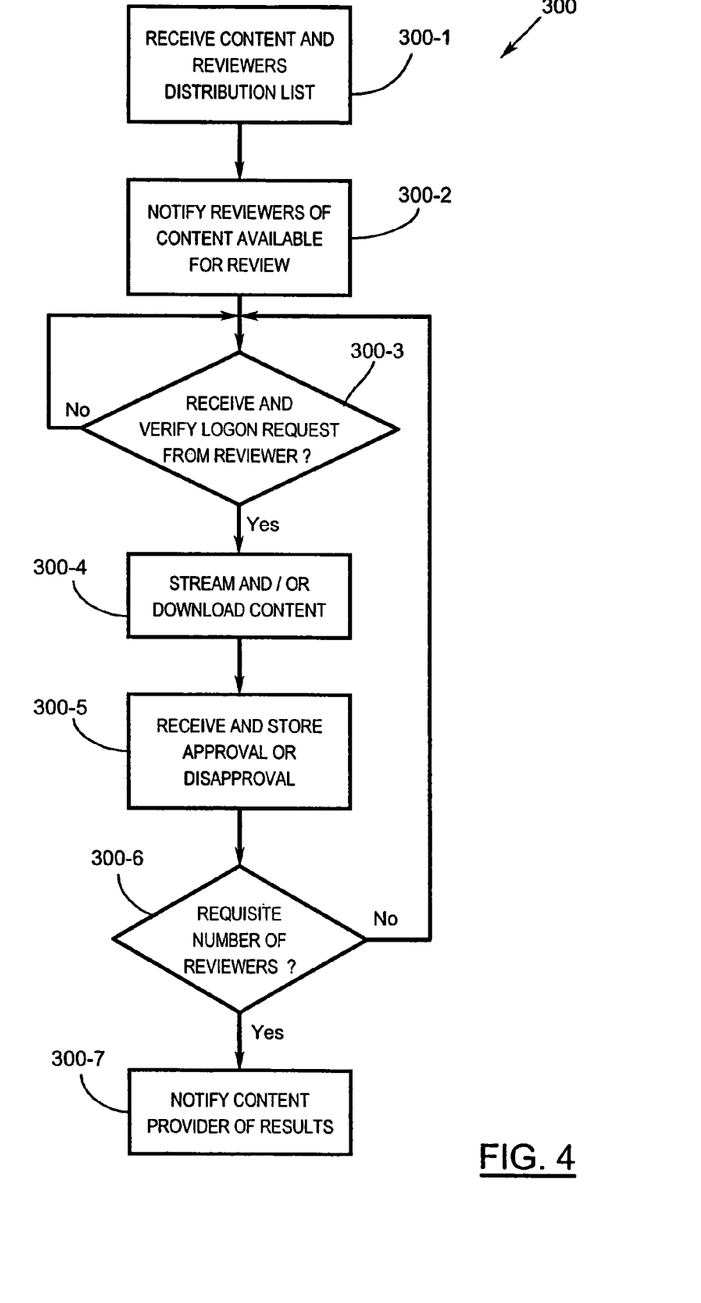
FIG. 4 shows, in flowchart form, an embodiment of a content approval process according to the present invention.

Reference is now made to FIG. 4, which shows, in flowchart form, an embodiment of a content approval process 300. In this embodiment, the content is a proposed advertisement prepared by an advertising firm. Using the system 10 (FIG. 1), the process 300 begin in step 300-1 when an individual at the firm, such as a traffic manager, employs the content provider computer system 22 (FIG. 1) to upload the content to the server 14 (FIG. 1), as described above. In addition to uploading the content, the advertising firm specifies one or more reviewers for inclusion in the distribution list 49 (FIG. 1). In step 300-2, the system 10 notifies the reviewers that they are required to review and approve or disapprove of an advertisement. Reviewers may include any number of people whose views are important in evaluating the potential of a new advertising campaign. For example, the reviewers may include members of the advertising firm including the client representative, an executive responsible, a producer or the traffic manager. The reviewers may also include individuals associated with the client, such as personnel within the client's marketing department, executives, or others. In one embodiment, the distribution list 49 is tiered, whereby the first tier of reviewers are internal advertising firm reviewers and the second tier of reviewers are external client reviewers. In this embodiment, the second tier of reviewers are not notified about the proposed advertisement and cannot access the advertisement until the first tier of reviewers have granted approval to the proposed advertisement.

When a reviewer logs onto the system 10 (step 300-3) using a recipient computer system 12 (FIG. 1), the system 10 verifies his or her identity using the identity verification module 32 (FIG. 1) and the reviewer's personal biometric profile 56 (FIG. 1). Once a reviewer has logged onto the system 10, he or she may download the advertisement so as to review it (step 300-4). The advertisement may be stored in an encrypted and encoded format, such that decryption and decoding information would also be transmitted to the reviewer provided their identity was verified by the system 10. The advertisement might also be streamed to the recipient computer system 12, instead of being downloaded in a file format.

Once the reviewer has had an opportunity to evaluate the proposed advertisement, he or she is required to register his or her approval or disapproval. The system 10 receives the reviewer's answer as to whether the advertisement is approved and stores it (step 300-5). The system 10 may also permit the reviewer to submit comments or suggestions with their approval or disapproval or to make their approval subject to specified changes.

In step 300-6 the system 10 evaluates whether it has received a sufficient number of approvals according to a set of business rules established by the advertising firm. The default rule may be that every reviewer must have registered his or her approval or disapproval, however other rules may be applied. For example, it may be sufficient if the advertisement has been approved by the executive and the client representative, even though the producer has not given his or her approval.

Once a sufficient number of reviews have been obtained, the system 10 notifies the advertising firm, the traffic manager or another designated individual of the results of the approval process 300 (step 300-7). In an alternative embodiment, the system 10 notifies the firm of every reviewer's response as soon as it is received, rather than accumulating a sufficient number of responses to rule upon the advertisement. The advertising firm then reviews and evaluates the responses received and any comments or suggestions made.

If the advertisement has been approved, in accordance with whatever criteria or business rules are being applied, i.e. unanimous approval, majority approval, etc., then the advertising firm (through its traffic manager or another individual) may again access the system 10 so as to create a distribution list 49 for distributing the campaign to whatever radio stations or other media outlets are supposed to receive it. This distribution may then be made in the manner described above with reference to FIG. 3.

The present invention may be embodied in other specific forms without departing from the spirit or essential characteristics thereof. Certain adaptations and modifications of the invention will be obvious to those skilled in the art. Therefore, the above discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A method of distributing content to a plurality of recipients over a distributed computer network, each recipient having a recipient terminal connected to the network, comprising the steps of:
   (a) storing, in server, a user profile for each recipient, each user profile comprising login information and a unique identifier;
   (b) receiving and storing, at the server, a content file, a release condition, a release state, and a distribution list associated with said content file, the receiving step being performed from a provider terminal connected to the network, wherein the distribution list contains unique identifiers of specific authorized recipients of the content file;
   (c) receiving a request for access from one of the recipient terminals, the request containing login information;
   (d) in response to the request for access;
      a. comparing the received login information to the stored login information to verify that the request came from one of the recipients,
      b. based on the comparing step, retrieving the stored unique identifier from the user profile,
      c. verifying that the distribution list includes said one of said recipients by comparing the retrieved unique identifier to the distribution list; and
   (e) providing access to the content file at said one of the recipient terminals based on the release condition and the release state.

* * * * *